3,460,717
MIXING ASSEMBLY FOR A DISPENSER
Donald J. Thomas, Town and Country, Mo., assignor to Burger Chef Systems, Inc., Indianapolis, Ind., a corporation of Indiana
Filed Oct. 16, 1967, Ser. No. 675,372
Int. Cl. B67d 5/56
U.S. Cl. 222—129.1       7 Claims

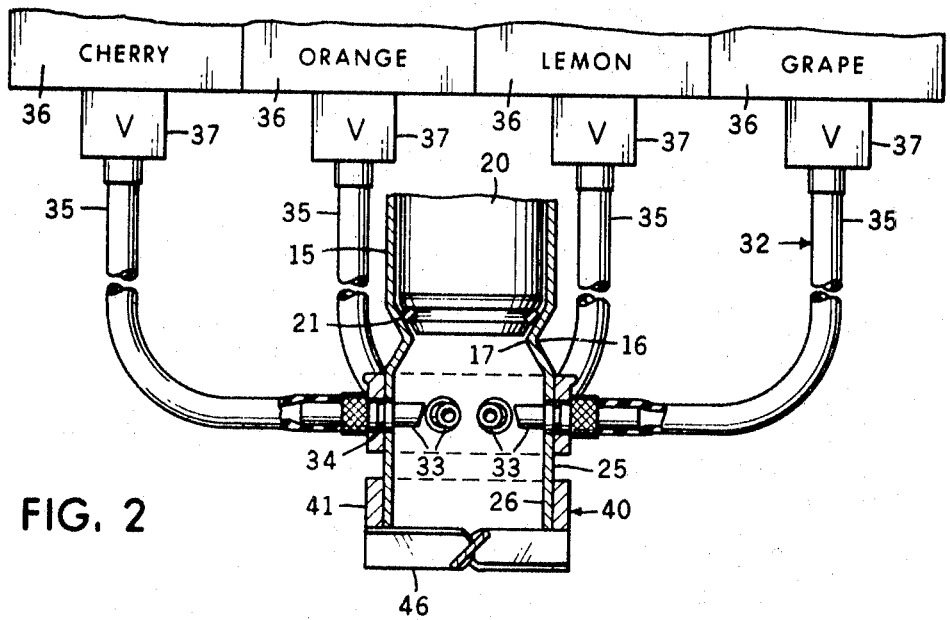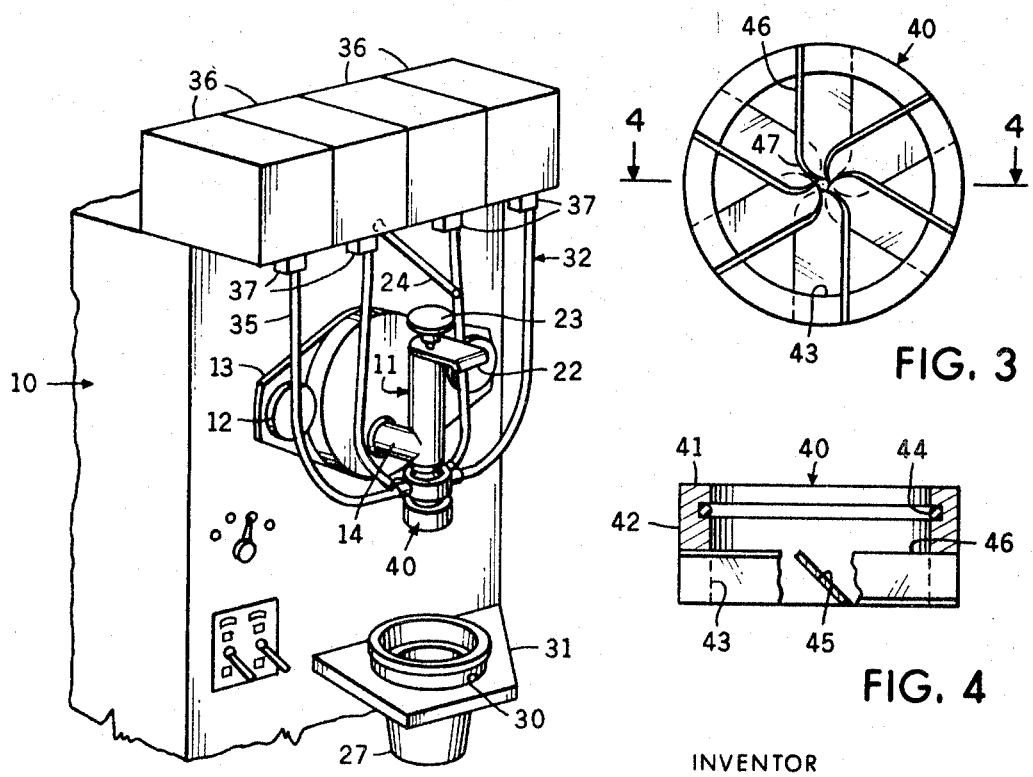

ABSTRACT OF THE DISCLOSURE

A mixing assembly for a dispenser of semi-fluid substances such as slush and soft ice cream, which includes a non-rotating mixing means carried by a nozzle and located at the discharge outlet of such nozzle. Flavoring is introduced into the nozzle upstream of the mixing means. Upon actuation of a valve means, that controls flow of the substance from a reservoir through the nozzle, the mixing means disperses the flavoring into the substance upon discharge from the nozzle. The mixing means includes a plurality of vanes extending across the nozzle at the discharge outlet, the vanes being relatively stationary to the nozzle during usage. An attachment means enables quick and easy connection of the mixing means to the nozzle, and permits ready disconnection for cleaning and maintenance. The attachment means provides an effective seal.

Background of the invention

This invention relates generally to improvements in a mixing assembly for a dispenser, and more particularly to a mixer of this type adapted to mix a flavor in substances such as shakes, slush and soft ice cream upon discharge from a dispensing nozzle. The present mixer is especially adapted for use in the dispensing of flavored slush.

In using the heretofore conventional dispensers, the soft slush was discharged from a nozzle directly into a serving container. A flavoring was then added to the slush in the container. Of course, such flavoring could be added to the container before filling with the slush. Then, the container was placed in a mixer with the impeller submerged in the slush, and the slush was mixed. This procedure was time-consuming, required several individual and distinct steps, and the mixer impeller had to be cleaned after each operation in order to avoid contamination of subsequent slush products, particularly if the slush were of a different flavor.

Other types of dispensers had a mixer carried directly by the dispenser and located adjacent the nozzle. Flavoring was added to the container and the container was placed under the nozzle with the mixer impeller inserted. The slush was discharged into the container and the mixer was energized to mix the flavoring. Again, this procedure involved a number of different, separate steps, and required the cleaning of the impeller if contamination of subsequent slush products was to be avoided.

Summary of the invention

The present mixing assembly utilizes a non-rotating mixing unit in the nozzle immediately downstream of the point at which flavoring is introduced into the nozzle by a feed means, and preferably is located at the discharge outlet of the nozzle. The mixing unit, by its structure, stirs the flavoring with the slush substance passing through the nozzle. The slush is stirred completely, immediately prior to or upon discharge from the nozzle into the container. The introduction of flavoring as an ingredient into the slush substance, and stirring it in by a mixing unit in the nozzle at the last moment upon discharge from the nozzle outlet, provides a resultant slush product that is really different than a slush preflavored before freezing and at least equal to a slush product that is mixed externally of the nozzle. Because the flavoring ingredient is not completely dispersed, although well stirred, the slush has varying concentrations and sizes of ice crystals, flavoring and free water which achieves a unique and pleasing taste.

The mixing means at the discharge outlet of the nozzle includes a plurality of vanes extending radially from the center axis of the nozzle and inclined in the same angular direction about the center nozzle axis. The vanes are located substantially at the discharge outlet, and are stationary relative to the nozzle when used. The combined slush and flavoring passes through the nozzle and engages the inclined vanes at the discharge outlet. The vanes direct the combined slush and flavoring in a circular, swirling pattern and consequently stirs the flavoring into the slush. The resultant, flavored slush then passes from the vanes directly into the serving container.

Specifically, the mixing means includes a rim connected to the nozzle at the discharge outlet, with an effective seal between the rim and nozzle. The plurality of vanes are attached to and extend radially inward of the rim. The rim consists of an upper portion receiving the nozzle, and a lower portion provided with a plurality of circumferentially spaced slots inclined in the same angular direction about the center axis of the rim and nozzle. The inclined slots are open at the bottom of the lower rim portion, and the vanes are fitted into the slots through the bottom of the lower rim portion.

For most efficient operation and structural arrangement, the nozzle is disposed substantially vertical with the discharge outlet opening at its bottom. The valve means includes a port in the nozzle upstream of and adjacent to the entrance of the feed means into the nozzle, while the mixing means is disposed at the discharge outlet of the nozzle adjacent to and downstream of such flavoring entrance.

The vanes 46, in swirling the slush, and the vertical disposition of the nozzle 25 have a self-cleaning action that eliminates the need for a wash cycle to cleanse the vanes 46 and the nozzle interior between dispensements of individual portions of ice slush.

Other functional advantages are realized by the mounting of the mixing unit on the nozzle, and the specific construction of the mixing unit that cooperates with such mounting to achieve an uninhibited flow through the nozzle, and to achieve quick and easy removal and replacement of the mixing unit for ease of cleansing and maintenance.

A control means operatively connects the valve means with the feed means so that the feed means introduces flavoring into the nozzle when the valve means is open, and stops the introduction of flavoring when the valve means is closed.

Brief description of the drawing

FIG. 1 is a fragmentary, perspective view showing the mixing assembly on a dispenser;

FIG. 2 is a fragmentary, cross-sectional view of the assembly;

FIG. 3 is a bottom plan view of the mixing unit, and

FIG. 4 is a cross-sectional view taken on line 4—4 on FIG. 3.

Description of the preferred embodiment

Referring now by characters of reference to the drawing, and first to FIG. 1, it will be understood that the dispenser generally indicated by 10 is of the type adapted to dispense a semi-fluid substance such as a shake, ice slush or soft ice cream. The dispenser in FIG. 1 illustrates the environment in which the mixing assembly referred to by 11 can be utilized. For the purpose of describing the structure and operation of the dispenser 10 and mixing assembly 11, the dispensed substance will be called slush. The slush is usually stored in a refrigerated reservoir (not shown) within the cabinet of dispenser 10.

Fixed to the front wall of the dispenser cabinet by a pair of bolts 12, is a plate 13. The plate 13 overlies the front end of the cabinet reservoir. A tube 14, carried by and extending through the plate 13, communicates with the interior of the reservoir. The slush is selectively discharged from the reservoir through the tube 14.

The mixing assembly 11 includes an elongate, tubular nozzle 15 disposed with its longitudinal flow axis arranged vertically. The nozzle 15 communicates with the discharge tube 14 so that the slush passes through the tube 14 and into the nozzle 15. The tube 14 is disposed substantially horizontally and communicates with the nozzle 15 at one side.

From FIG. 2, it is seen that the nozzle 15 includes a reduced diameter portion 16 that forms a valve port 17. The valve means for controlling flow of the slush through the nozzle 15 includes an elongate valve plug 20 slidably and reciprocatively mounted in the nozzle 15 above the valve port 17. Carried by the lower end of the valve plug 20 is an O-ring 21 that engages the interior wall of the nozzle 15 at the reduced diameter portion 16 to provide an effective seal to close the valve port 17 when the valve plug 20 is lowered to the position illustrated in FIG. 2.

Attached to and carried by the upper end of the valve plug 20 is a laterally extending handle 22 (FIG. 1) which may be digitally gripped to lift the valve plug 20 and open the valve port 17. For reasons which will later appear, a knob 23 is attached to and movable with the valve plug 20, the knob 23 selectively engaging and moving an actuating arm 24 of a microswitch (not shown) incorporated in the electrical circuit. The nozzle 15 includes a vertically extending nozzle end 25 below the valve port 17, the nozzle end 25 being provided with a discharge outlet 26 at its bottom.

Upon lifting the valve plug 20, the valve port 17 is opened and the slush is fed into the nozzle 15 through the tube 14 from the reservoir, and then is fed through the valve port 20, through the nozzle end 25 and out the discharge outlet 26.

As is shown in FIG. 1, a receptacle 27 is located below the nozzle end 25 in a position to receive possible drippage only. For convenience, the drippage receptacle 27 is located in an opening 30 formed in a platform 31 extending forwardly from the front wall of the dispenser cabinet, the platform 31 supporting the receptacle 27.

Flavoring is added to the slush in the nozzle end 25 through a feed means generally indicated by 32. In the embodiment shown in FIG. 2, the feed means 32 includes a plurality (a total of four in the specific embodiment) of injector nozzles 33 mounted on a collar 34 fixed to the nozzle end 25, and projecting into the interior of the nozzle end 25 immediately adjacent to and below the valve port 17. Each injector nozzle 33 is connected by a line 35 to a flavoring tank 36 through a suitable solenoid valve 37. Each of the tanks 36 carries a different flavoring, such as cherry, orange, lemon and grape. While four tanks 36 and cooperating injector nozzles 33 are shown in FIG. 2, it will be understood that any number of such feed lines may be utilized, depending upon the variety of flavorings desired.

When a selected valve 37 is energized to open its associated line 35, the flavoring will move from the tank 36 by gravity through the line 35, will pass through the coacting ejector nozzle 33 into the nozzle end 25, and will pass into the slush flowing through the nozzle end 25.

Instead of a gravity system, the flavoring may be fed from suitable tanks by means of pumps (not shown). Either system may be utilized. When the pump system is used, the pump associated with the flavoring selected, upon energization of the electrical system, will force flavoring from its associated flavoring tank through the coacting ejector nozzle 33.

A non-rotating mixing means generally referred to by 40 is carried by the nozzle end 25 and is located at the discharge outlet 26. The mixing means 40 includes a substantially circular rim 41 embracing and receiving the nozzle end 25. The rim 41 consists of an upper rim portion 42 and an integral lower rim portion 43. The inside diameter of the upper rim portion 42 closely approximates the outside diameter of the nozzle end 25. Carried by and within the upper rim portion 42 is an O-ring 44 that effectively engages and seals the upper rim portion 42 and nozzle end 25 when the mixing means 40 is installed. In addition, the close fit provided between the upper rim portion 42 and nozzle end 25, and the frictional engagement of the O-ring 44 cooperate to hold the mixing means 40 in assembly, yet enable the mixing means 40 to be readily removed for cleansing and maintenance and readily replaced.

Formed in the lower rim portion 43 are a plurality of circumferentially spaced slots 45, the slots 45 being open at the bottom of the lower rim portion 43 and being inclined in the same angular direction about the center axis of the rim 41.

A plurality of vanes 46 are attached to the rim 41 and extend radially inward toward the center axis of the rim 41. The vanes 46 are inserted into the slots 45 through the open ends of such slots 45 provided at the bottom of the lower rim portion 43. Accordingly, the vanes 46 are inclined in the same angular direction. To avoid interference at the center axis of rim 41, the vanes 46 have rounded terminal ends 47 substantially at the center axis, as is best seen in FIG. 3.

When the mixing means 40 is installed on the nozzle end 25, the nozzle end 25 is inserted into the upper rim portion 40 until the nozzle end 25 abuts the upper margins of the vanes 46, as is shown in FIG. 2. The frictional engagement of the upper rim portion 42 and the O-ring 44 which the nozzle end 25 maintains the mixing means 40 in assembly until it is intentionally removed. When the mixing means 40 is installed, the vanes 46 extend radially inward from the lower rim portion 43 and nozzle end 25 toward the center axis of the nozzle end 25 at the discharge outlet 26.

When the ice slush flows through the nozzle end 25, flavoring is introduced into the nozzle end 25 through at least one of the injector nozzles 33. The swirling action of the vanes 46 of the mixing means 40 mixes the flavoring into the ice slush as both the flavoring and slush pass by the vanes 46. The resultant slush mix is dispensed through the discharge outlet 26 by the vanes 46 into the serving container held below the mixing means 40. After the desired quantity of ice slush is mixed with flavoring and discharged into the container, the flow of the slush through the nozzle end 25 is halted. Any ice slush and combined flavoring in the nozzle end 25 when the valve port 17 is closed, will immediately fall and be swirled by the vanes 46 into the container. Any minor residue on the interior of the nozzle end 25 and on the vanes 46 will drip quickly into the receptacle 27. Because the mixing means 40 is self-cleaning, it is not necessary to provide mechanism for flushing the mixing means 40 and nozzle end 25 in a wash cycle between mixing of individual portions of ice slush products.

It is thought that the functional advantages of the mixing assembly have become fully apparent from the foregoing deailed description of parts, but for completeness of disclosure, the operation will be briefly described. It will be assumed that it is desired to dispense an ice slush having a particular flavor, such as grape. Further, it will be assumed that in this example, a gravity feed system for introducing such flavoring is utilized as is shown in FIG.

2, although it will be understood that a system using pumps could be employed if desired.

A serving container (not shown) is located below the nozzle 15 and over the drippage receptacle 27. The dispenser 10 is conditioned by a pre-selection mechanism for a particular flavoring. The operator lifts the handle 22 so as to raise the valve plug 20 and open the valve port 17, thereby allowing flow of the ice slush from the dispenser reservoir into the nozzle 15 through the feed tube 14. Simultaneously, upon lifting the valve plug 20, the knob 23 will engage the actuating arm 24 of a micro-switch (not shown), the micro-switch being in an electrical circuit with the solenoid valves 37. Upon closing the microswitch, one of the solenoid valves 37 is opened to permit flow of the selected flavoring from its tank 36 through the associated feed line 35 and into the nozzle end 25 through the associated ejector nozzle 33. As the ice slush passes through the valve port 17, the flavoring is introduced into the slush through the ejector nozzle 33. Immediately, the combined flavoring and slush engages the vanes 46 at the discharge outlet 26 of the nozzle end 25. The vanes 46 swirl the combined flavoring and slush in a circular pattern about the center axis of the nozzle, thereby mixing the flavoring in the ice slush. The resultant, flavored slush is discharged from the vanes 46 into the serving container located below the mixing means 40.

When the serving container is filled, the operator lowers the valve plug 20 to close the valve port 17, thereby stopping the flow of the ice slush through the nozzle 16. Simultaneously, when the valve plug 20 closes the valve port 17, the knob 23 disengages from the actuating arm 24 and the electrical circuit is opened to de-energize the solenoid valve 37 in the selected flavoring feed line 35. The valve 37 closes the feed line 35 and stops the introduction of flavoring into the nozzle end 25 through the associated ejector nozzle 33. Any remainder of the flavoring and ice slush in the nozzle end 25 quickly passes through the vanes 46 where the combined ingredients are mixed, and falls into the receptacle. Because of the construction of the nozzle end 25 and vanes 46, the ice slush is not retained within the nozzle end 25 or on the vanes 46 after the dispensing action is halted. There may be a minimal amount of drippage into the receptacle 27 after the slush container is removed. However, the nozzle end 25 and the mixing unit 40 is clean and in condition for dispensing another ice slush of the same or different flavor.

If necessary, the mixing means 40 can be simply pulled off the nozzle end 25 and cleaned. After cleansing, the mixing unit can be readily replaced by pushing the upper rim portion 42 on the nozzle end 25.

Although the invention has been described by making detailed reference to a preferred embodiment, such detail is to be understood in an instructive, rather than in any restrictive sense, many variants being possible within the scope of the claims hereunto appended.

I claim as my invention:
1. A mixing assembly for a dispenser of semi-fluid substances such an slush and soft ice cream from a reservoir, the improvement comprising:
    (a) a nozzle having an inlet communicating with the reservoir, and having a discharge outlet,
    (b) a valve means controlling flow of the substance from the reservoir through the nozzle,
    (c) a non-rotating mixing means at the discharge outlet of and carried by the nozzle, the mixing means including a plurality of vanes extending radially substantially from the center axis of the nozzle and inclined relative to the nozzle axis, the vanes being located substantially at the discharge outlet and being stationary relative to the nozzle during usage, and
    (d) feed means introducing flavor into the nozzle downstream of the valve means, and upstream of the mixing means so that the mixing means disperses the flavoring into the substance upon discharge from the nozzle.
2. A mixing assembly as defined in claim 1, in which:
    (e) the feed means includes an open-ended injector tube injecting flavor into the nozzle transversely of the center axis of the nozzle.
3. A mixing assembly as defined in claim 1, in which:
    (e) the mixing means includes
        (1) a detachable rim connected to the nozzle at the discharge outlet,
        (2) retaining means between the rim and nozzle, and
    (f) the vanes are attached to and extend radially inward of the rim, the vanes being inclined in the same angular direction about the center axis of the rim and being located substantially at the discharge outlet.
4. A mixing assembly as defined in claim 1, in which:
    (e) the vanes are inclined in the same angular direction about the center axis of the nozzle, and have free terminal ends substantially at the nozzle axis.
5. A mixing assembly as defined in claim 1, in which:
    (e) the mixing means includes a rim having an upper portion, the upper rim portion receiving the nozzle at the discharge outlet, and the lower rim portion being provided with a plurality of circumferentially spaced slots inclined in the same angular direction about the center axis of the lower rim portion, and
    (f) the vanes are located in the slots and attached to the lower rim portion, the vanes extending radially inward of the rim and of the nozzle at the discharge outlet, the vanes being inclined in the same angular direction about the center axis of the lower rim portion.
6. A mixing assembly as defined in claim 5, in which:
    (g) an O-ring seal is provided between the nozzle and the upper rim portion to frictionally retain the rim on the nozzle, and
    (h) the nozzle at the discharge outlet engages the vanes which provide stop means to limit the interfitting relationship of the nozzle and upper rim portion.
7. A mixing assembly as defined in claim 5, in which:
    (g) the inclined slots open at the bottom of the lower rim portion, and
    (h) the vanes are fitted into the slots through the bottom of the lower rim portion, the vanes extending radially inward toward the center axis of the rim and nozzle and having free terminal ends.

References Cited

UNITED STATES PATENTS

| 451,161 | 4/1891 | Nichols | 239—400 X |
| 3,082,960 | 3/1963 | Swan | 239—600 X |
| 3,272,388 | 9/1966 | Whitmore | 222—145 X |
| 3,339,805 | 9/1967 | Wheeler | 222—145 X |

ROBERT B. REEVES, Primary Examiner

N. L. STACK, Jr., Assistant Examiner

U.S. Cl. X.R.

222—132, 144, 145